(12) United States Patent
Mody et al.

(10) Patent No.: US 11,175,307 B1
(45) Date of Patent: Nov. 16, 2021

(54) CONDUCTIVE ATOMIC FORCE MICROSCOPY SYSTEM WITH ENHANCED SENSITIVITY AND METHODS OF USING SUCH A SYSTEM

(71) Applicant: GLOBALFOUNDRIES U.S. Inc., Santa Clara, CA (US)

(72) Inventors: Jay Mody, Ballston Lake, NY (US); Hemant Dixit, Halfmoon, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/005,883

(22) Filed: Aug. 28, 2020

(51) Int. Cl.
*G01Q 30/16* (2010.01)
*G01Q 60/24* (2010.01)

(52) U.S. Cl.
CPC ............ *G01Q 30/16* (2013.01); *G01Q 60/24* (2013.01)

(58) Field of Classification Search
CPC ................................ G01Q 30/16; G01Q 60/24
USPC ........ 850/21, 33, 34, 35, 36, 37, 38, 39, 40, 850/41, 52
See application file for complete search history.

(56) References Cited

U.S. PATENT DOCUMENTS

| | | | |
|---|---|---|---|
| 6,011,261 A | 1/2000 | Ikeda et al. | |
| 6,930,502 B2 | 8/2005 | Lee et al. | |
| 7,214,303 B2 | 5/2007 | Naughton | |
| 7,534,999 B2 | 5/2009 | Suzuki et al. | |
| 7,847,926 B2 | 12/2010 | Meyer et al. | |
| 7,944,550 B2 | 5/2011 | Bumm et al. | |
| 9,984,941 B2 | 5/2018 | Bedell et al. | |
| 2008/0038542 A1 | 2/2008 | Park et al. | |
| 2014/0203707 A1 | 7/2014 | King et al. | |
| 2014/0306731 A1* | 10/2014 | Wang | B82Y 35/00 324/754.07 |

FOREIGN PATENT DOCUMENTS

| | | |
|---|---|---|
| EP | 3087400 B1 | 11/2019 |
| JP | 6044521 B2 | 12/2016 |
| WO | 2014/174997 A1 | 10/2014 |

OTHER PUBLICATIONS

Ageev et al., "Investigation of the Nanodiagnostics Probe Modes for Semiconductor Resistivity Measurements by Atomic Force Microscopy," Advanced Materials Research, 894:374-78, 2014.

(Continued)

*Primary Examiner* — Nicole M Ippolito
(74) *Attorney, Agent, or Firm* — Anthony Canale; Hoffman Warnick LLC

(57) ABSTRACT

An illustrative method disclosed herein includes measuring at least one electrical-related parameter of a doped semiconductor material by simultaneously irradiating at least a portion of an upper surface of the doped semiconductor material, urging a conductive tip of a cantilever beam probe into conductive contact with the upper surface of the irradiated portion of the doped semiconductor material, and generating an electrical current that flows through the doped semiconductor material, through a measurement device that is operatively coupled to the cantilever beam probe and through the cantilever beam probe, wherein the measurement device measures the at least one electrical-related parameter of the doped semiconductor material.

20 Claims, 5 Drawing Sheets

(56) References Cited

OTHER PUBLICATIONS

Lin and Wu, "A Study of the Photoelectric Effect Caused by a Laser Beam Used in a Beam Bounce Technique in a C-AFM System," ISTFA 2008: Proceedings from the 34th International Symposium for Testing and Failure Analysis, Nov. 2-6, 2008.
Lin et al., "A Study of Bipolar Phototransistor Action Existing in CMOS Process Triggered by a Laser Beam Used in a C-AFM System," IEEE CFP09RPS-CDR 47th Annual International Reliability Physics Symposium, pp. 801-803, 2009.

\* cited by examiner

CONDUCTIVE ATOMIC FORCE MICROSCOPY SYSTEM WITH ENHANCED SENSITIVITY AND METHODS OF USING SUCH A SYSTEM

FIELD OF THE INVENTION

The present disclosure is directed to various novel embodiments of a conductive atomic force microscopy (C-AFM) system with enhanced sensitivity and various novel methods of using such a C-AFM system.

BACKGROUND

Manufacturers of integrated circuit products rely on a variety of metrological tools to help control process operations and identify device failures. For example, C-AFM systems may be used for measuring a variety of parameters, e.g., dopant concentration levels, grain boundary resistance values, resistance across interfacial films, etc. In terms of resistance measurements, a typical C-AFM system is accurate up to about 0.1-1.0Ω. In terms of dopant concentrations, the cited range for the resistance values typically corresponds to a semiconductor substrate having a dopant concentration of about $1e^{14+}$-$1e^{17}$ ions/cm$^3$. However, in some products, e.g., waveguides on a silicon photonics product, it is desirable for the semiconductor substrate to have a lower concentration of dopant atoms, e.g., $1e^{12}$-$1e^{15}$ ions/cm$^3$, or less, so as to increase the depletion width of the waveguide. However, such lower dopant concentration levels are difficult to measure using current-day C-AFM systems.

The present disclosure is generally directed to various novel embodiments of a C-AFM system with enhanced sensitivity and various novel methods of using such a C-AFM system that may at least reduce one or more of the problems identified above.

SUMMARY

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various novel embodiments of a C-AFM system with enhanced sensitivity and various novel methods of using such a C-AFM system. One illustrative method disclosed herein includes measuring at least one electrical-related parameter of a doped semiconductor material by simultaneously irradiating at least a portion of an upper surface of the doped semiconductor material, urging a conductive tip of a cantilever beam probe into conductive contact with the upper surface of the irradiated portion of the doped semiconductor material, and generating an electrical current that flows through the doped semiconductor material, through a measurement device that is operatively coupled to the cantilever beam probe and through the cantilever beam probe, wherein the measurement device measures the at least one electrical-related parameter of the doped semiconductor material.

Another illustrative method disclosed herein includes measuring at least one electrical-related parameter of at least one layer of material positioned above a doped semiconductor material by simultaneously irradiating at least a portion of an upper surface of the at least one layer of material with radiation, thereby defining an irradiated portion of the at least one layer of material, urging a conductive tip of a cantilever beam probe into contact with the upper surface of the irradiated portion of the at least one layer of material, and generating an electrical current that flows through the at least one layer of material, through the doped semiconductor material, through a measurement device that is operatively coupled to the cantilever beam probe and through the cantilever beam probe, wherein the measurement device measures the at least one electrical-related parameter of the at least one layer of material.

Yet another illustrative method disclosed herein includes measuring at least one electrical-related parameter of a device structure comprising a doped semiconductor material by simultaneously irradiating at least a portion of the device structure with radiation, thereby defining an irradiated portion of the device structure, urging a conductive tip of a cantilever beam probe into a position wherein the conductive tip is conductively coupled to the irradiated portion of the device structure, and generating an electrical current that flows through the device structure, through a measurement device that is operatively coupled to the cantilever beam probe and through the cantilever beam probe, wherein the measurement device measures the at least one electrical-related parameter of the device structure

BRIEF DESCRIPTION OF THE DRAWINGS

The disclosure may be understood by reference to the following description taken in conjunction with the accompanying drawings, in which like reference numerals identify like elements, and in which.

Figure 1:
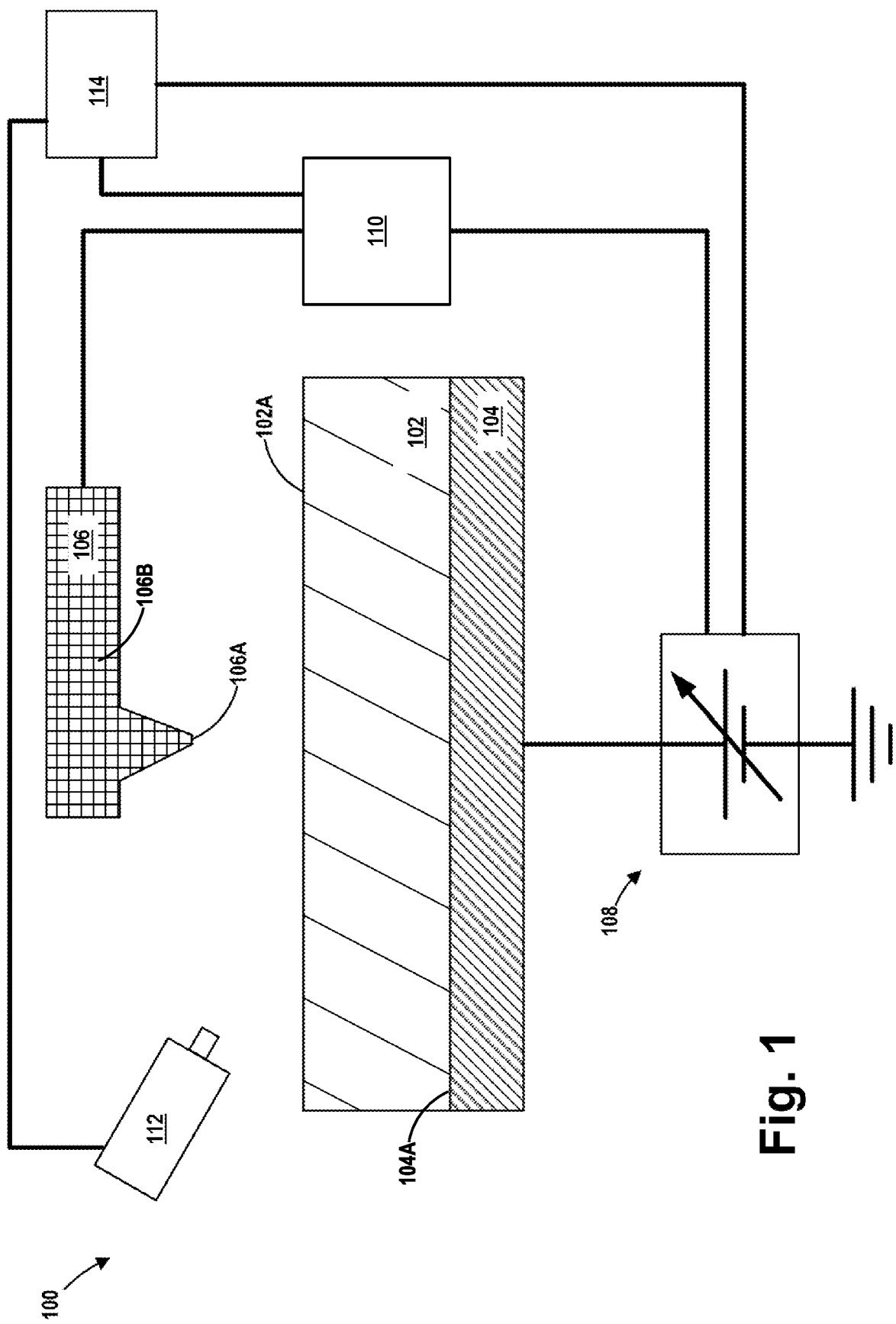
FIGS. 1-5 depict various novel embodiments of a C-AFM system with enhanced sensitivity and various novel methods of using such a C-AFM system. The drawings are not to scale.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As will be readily apparent to those skilled in the art upon a complete reading of the present application, the presently disclosed systems and methods may be employed in connection with the manufacturing of a variety of products and devices. For example, the systems and methods disclosed herein may be employed in the manufacturing of a variety of integrated circuit products, such as, logic products, memory products, SOC products, silicon photonic products, ASICs, embedded memory products, etc. The systems and methods disclosed herein may also be employed by the manufacturers of semiconductor substrates (bulk substrates and/or SOI substrates). Other applications where the systems and methods may be employed will be recognized by those skilled in the art after a complete reading of the present application. The various components, structures and layers of material depicted herein may be formed using a variety of different materials and by performing a variety of known process operations, e.g., chemical vapor deposition (CVD), atomic layer deposition (ALD), a thermal growth process, spin-coating techniques, etc. The thicknesses of these various layers of material may also vary depending upon the particular application. With reference to the attached figures, various illustrative embodiments of the methods and systems disclosed herein will now be described in more detail.

FIGS. 1-5 depict various novel embodiments of a C-AFM system 100 with enhanced sensitivity and various novel methods of using such a C-AFM system 100. With reference to FIG. 1, in one illustrative embodiment, the C-AFM system 100 comprises an electrode 104, a cantilever beam probe 106 with a conductive tip 106A, a voltage supply source 108, a measurement device 110, a radiation source 112 and at least one controller 114. Also depicted in FIG. 1 is a doped semiconductor material 102, with an upper surface 102A, that is positioned on the electrode 104.

In the depicted example, the doped semiconductor material 102 takes the form of a cylindrical semiconductor substrate that is commonly used in manufacturing integrated circuit products. However, the doped semiconductor material 102 should not be considered to be limited to this particular example as the doped semiconductor material 102 may come in a variety of different configurations and sizes. For example, when viewed from above, the doped semiconductor material 102 may be a substantially rectangular shape portion of material that has been cut from a traditional cylindrical semiconductor substrate. The doped semiconductor material 102 may be doped with an N-type or P-type dopant. The dopant concentration in the doped semiconductor material 102 may vary depending upon the particular application. In one illustrative example, the dopant concentration of the doped semiconductor material 102 may fall within the range of about $1e^{12}$-$1e^{20}$ ion/cm$^3$.

The electrode 104 is adapted to have the doped semiconductor material 102 positioned thereon such that the electrode 104 is conductively coupled to the doped semiconductor material 102. The electrode 104 is also operatively coupled to the voltage supply source 108. The at least one controller 114 is operatively coupled to the voltage supply source 108, the radiation source 112 and the measurement device 110. The electrode 104 engages conductive contacts (not shown) on the back of the doped semiconductor material 102. The voltage supply source 108 is adapted to apply a voltage to the doped semiconductor material 102 via the electrode 104 at the direction of the at least one controller 114. FIG. 1 depicts the C-AFM system 100 prior to the C-AFM system 100 being used to measure any characteristic of the doped semiconductor material 102.

In the illustrative example, where the doped semiconductor material 102 is a traditional cylindrical semiconductor substrate, it may have a variety of configurations, such as a bulk semiconductor substrate, or it may have a semiconductor-on-insulator (SOI) configuration that includes a base semiconductor layer, a buried insulation layer and an active semiconductor layer positioned above the buried insulation layer, wherein transistor devices (not shown) are formed in and above the active semiconductor layer. The doped semiconductor material 102 may be made of silicon or it may be made of semiconductor materials other than silicon, or compound semiconductor materials. Thus, the terms "substrate" or "semiconductor substrate" should be understood to cover all semiconductor materials (including compounds thereof) and all forms of such materials.

The electrode 104 may be of any desired size or configuration. In the depicted example, the electrode 104 may take the form of a traditional wafer stage. In one illustrative example, the electrode 104 may be made entirely of a conductive material, e.g., a metal, a metal alloy, etc. In other embodiments, only an upper portion of the vertical thickness of the electrode 104 may be a conductive material, while the remaining thickness of the electrode 104 may be made of a non-conductive material. In some applications, the entire upper surface 104A of the electrode 104 may be a conductive material, while, in other applications, only certain portions of the upper surface 104A may have conductive material formed thereon.

The cantilever beam probe 106 may be of any desired configuration and size. The conductive tip 106A and the main body 106B of the cantilever beam probe 106 may comprise a conductive material such as, for example, a metal, a metal alloy, a metal silicide, etc. In one particular embodiment, the cantilever beam probe 106 may be a diamond-coated conductive material. In one illustrative example, the entire main body 106B of the cantilever beam probe 106 may be made of a conductive material, while, in other applications, only a portion of the main body 106B may be made of a conductive material. In one illustrative embodiment, when viewed from below, the conductive tip 106A may have a substantially circular configuration, but that may not be the case in all applications. In one particular example, the conductive tip 106A may have a diameter of about 1-20 nm.

The voltage supply source 108 may be any commercially available voltage source that is capable of generating a voltage to be applied to the electrode 104 at the direction of the at least one controller 114. In one illustrative example, the voltage supply source 108 may be a variable DC voltage supply source capable of generating a voltage that falls within the range of about 1 mV-10 volts. As noted above, the voltage supply source 108 is operatively coupled to the electrode 104 and the at least one controller 114.

The measurement device 110 may be any commercially available device that is capable of measuring at least one electrical-related parameter, e.g., current, charge, voltage, ultra-low current (e.g., $1e^{-15}$-$1e^{-3}$ amps) and ultra-high resistance (e.g., Gohms) and supplying those measurement values to the at least one controller 114. In one illustrative embodiment, the measurement device 110 may be an ammeter, a picoammeter, an ohmmeter, etc. As depicted, the measurement device 110 is operatively coupled to the at least one controller 114, the voltage source 108 and the cantilever beam 106.

The radiation source 112 is operatively coupled to the at least one controller 114. The radiation source 112 may be any commercially available radiation source that is capable of generating radiation at the direction of the at least one controller 114. The radiation source 112 may use any of a variety of materials to generate radiation, e.g., aluminum, gallium, copper, etc. In general, the radiation source 112 must be capable of generating radiation with at least 13.6 eV per photon. In a more specific example, the radiation source 112 may generate radiation with an energy level per photon that falls within the range of 124 eV (EUV) 124 keV (Hard Xray/Gamma rays), inclusive of the endpoints of the range. Importantly, with a radiation source 112 that can generate radiation within the above quoted range, the C-AFM system 100 may be used to perform testing on virtually all of the materials that are commonly used in semiconductor manufacturing, thereby making the C-AFM system 100 more valuable and useful in a semiconductor fabrication facility as compared to other prior C-AFM systems with lower radiation generation capabilities that were limited to only testing certain materials. In some applications, the radiation source 112 may be capable of generating radiation having an energy level per photon greater than 124 keV. The class of radiation generated by the radiation source 112 will be above the visible spectrum of light, such as, for example, extreme ultraviolet (EUV), soft x-rays (SX), hard x-rays (HX), etc.

The at least one controller 114 depicted herein is intended to be representative in nature in that it may be any type of device capable of executing instructions. In some embodiments, the at least one controller 114 may be a microprocessor or a computer. The at least one controller 114 may be a stand-alone device or it may be part of an overall computer system that is adapted to control one or more aspects of the operations performed in a manufacturing or testing facility. The at least one controller 114 may be employed to perform various functions described herein. The functions performed by the at least one controller 114 may be performed by a single computing resource or by multiple computing resources.

Unless specifically stated otherwise, or as is apparent from the discussion, terms such as "processing" or "computing" or "calculating" or "determining" or "displaying" or the like refer to the actions and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
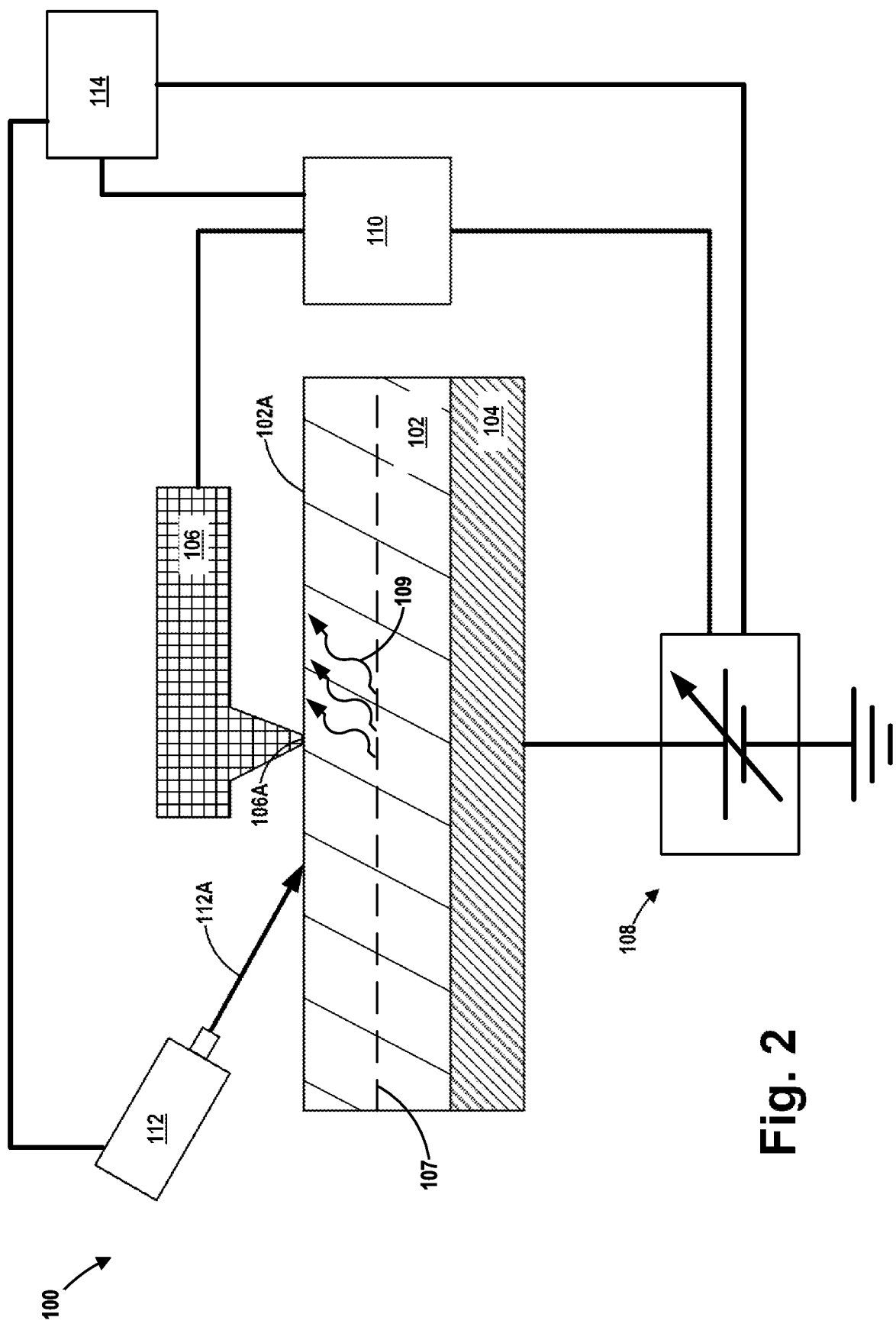

FIG. 2 depicts the C-AFM system 100 at a point in time wherein the voltage supply source 108 has applied a voltage to the doped semiconductor material 102 via the electrode 104, wherein the conductive tip 106A of the cantilever beam probe 106 has been urged into engagement with the upper surface 102A of the doped semiconductor material 102 and wherein the radiation source 112 has been activated to generate simplistically depicted radiation 112A that impacts the semiconductor substrate 102. In the depicted example, the radiation source 112 has been positioned such that the radiation 112A generated by the radiation source 112 impacts the surface 102A of the substrate 102 at a non-normal angle. However, as will be appreciated by those skilled in the art after a complete reading of the present application, the radiation source 112 may be positioned such that the radiation 112A may impact the surface 102A at any desired angle, including the situation where the angle between the incoming radiation 112A and the upper surface 102A of the doped semiconductor material 102 is substantially ninety degrees. The depth that the radiation 112A penetrates into the substrate 102, as reflected by the dashed line 107, may vary depending upon the particular applications. In one illustrative embodiment, the depth of penetration may be on the order of about 1-200 nm.

During the measurement process, relative movement is provided between the doped semiconductor material 102 and the conductive tip 106A that is in contact with the surface 102A of the doped semiconductor material 102 such that at least a portion of the doped semiconductor material 102 is scanned using the C-AFM system 100 disclosed herein. In one illustrative example, the conductive tip 106A remains in contact with the surface 102A of the doped semiconductor material 102 throughout the entire measurement process. In other embodiments, the conductive tip 106A may intermittently or periodically contact the surface 102A at various times during the measurement process. The relative movement may be accomplished by a variety of mechanical or electro-mechanical means known to those skilled in the art, e.g., rack and pinion arrangements, stepper motors, etc. For example, the doped semiconductor material 102 may be moved relative to a stationary cantilever beam probe 106, the cantilever beam probe 106 may be moved relative to a stationary doped semiconductor material 102 or both the doped semiconductor material 102 and the cantilever beam probe 106 may be moved relative to each other.

Irradiation of the substrate 102 leads to the photoemission of electrons, as simplistically depicted by the arrows 109, from the valance band edge of the material of the doped semiconductor material 102, which results in enhanced conductivity of the penetrated depth of the doped semiconductor material 102, e.g., irradiation of the substrate 102 results in enhanced current flow within the penetrated depth of the substrate 102. More specifically, irradiating the doped semiconductor material 102 enhances or increases the active ion concentration, i.e., the free charge carriers (i.e., electrons on holes) in the irradiated portion of the doped semiconductor material 102. In turn, the localized increase of free charge carriers in the irradiated portion of the doped semiconductor material 102 increases the conductivity of the doped semiconductor material 102 and thereby increases the signal-to-noise ratio of the electrical signal. Stated another way, all other things being equal (e.g., the applied voltage, etc.), the current that flows through the doped semiconductor material 102 while it is being irradiated will be greater than the current that would flow through the doped semiconductor material 102 without it being irradiated. The magnitude of this difference in current levels (when irradiated versus when not irradiated) varies depending upon a variety of factors and the materials involved.

As a result, the novel C-AFM system 100 disclosed herein enables more accurate measurement of ultra-low ion densities (charge carrier concentration) within the doped semiconductor material 102. Doped semiconductor materials 102 and, particularly, traditional doped cylindrical semiconductor substrates, with ultra-low ion densities, and accurate measurement of such ultra-low ion densities, is important for current and future products including, but not limited to, integrated circuit products, silicon photonic products, etc. As the measurement process occurs, various electrical related parameters of the doped semiconductor material 102 may be recorded by the measurement device 110 and transmitted to the controller 114, e.g., the current flowing through the doped semiconductor material 102 and/or the resistivity of the doped semiconductor material 102, etc. Based upon this electrical-related information about the doped semiconductor material 102, a variety of properties of the doped semiconductor material 102 may be determined or calculated, e.g., the doping level concentration in the doped semiconductor material 102, the spreading resistivity of the doped semiconductor material 102, the size and location of grain boundaries within the doped semiconductor material 102, etc. As a result, the novel C-AFM system 100 disclosed herein is more sensitive and thus more adept at measuring doped semiconductor materials 102 with low doping levels (e.g., $1e^{12}$-$1e^{15}$ ions/cm$^3$, or less) which are essentially high resistivity samples and grain boundaries as compared to prior art C-AFM systems.

Figure 3:
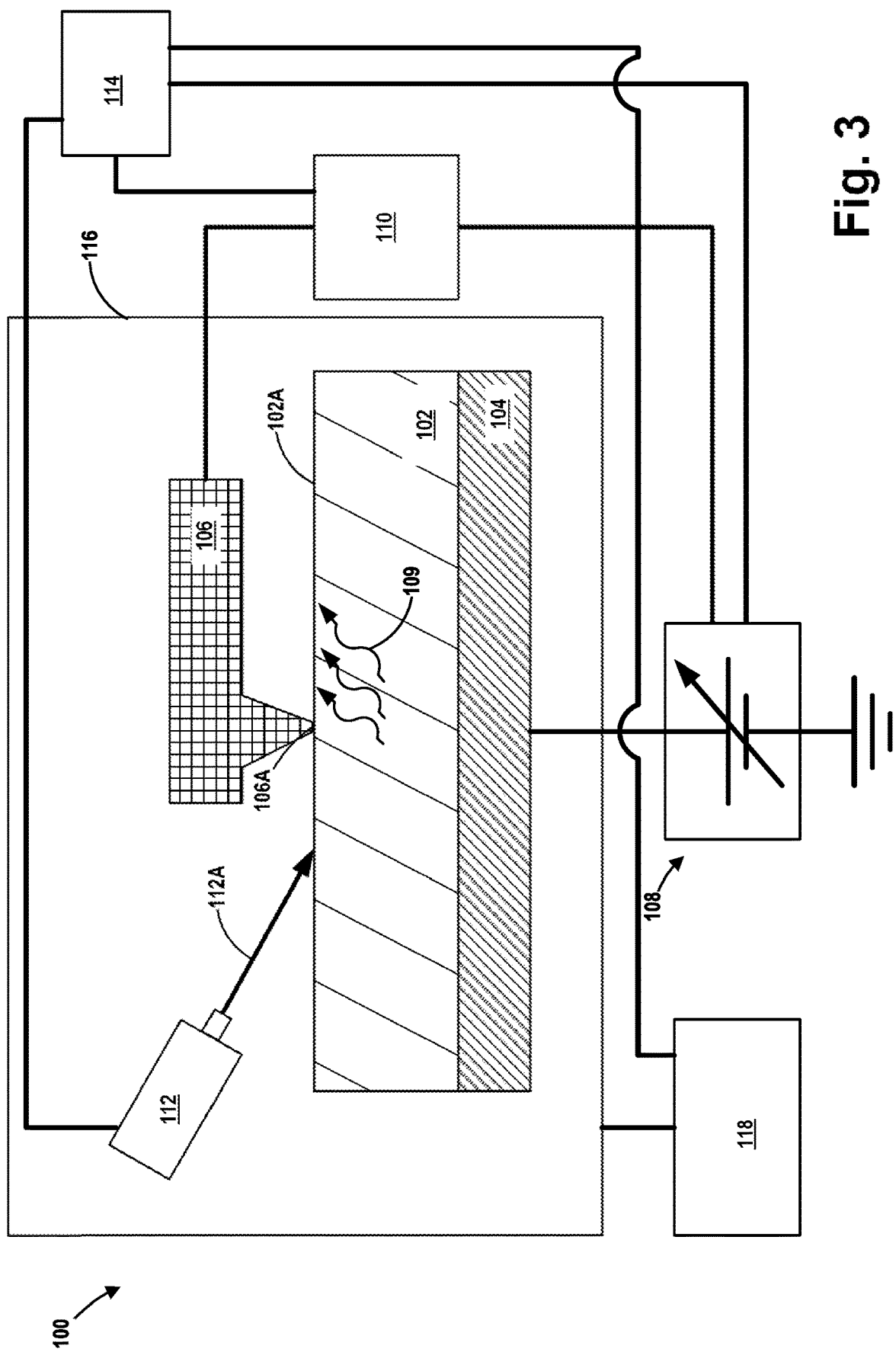

As will be appreciated by those skilled in the art after a complete reading of the present application, the novel C-AFM system 100 disclosed herein may be employed in open-air applications, e.g., inside of a clean room in a semiconductor manufacturing facility, or it may be employed in a vacuum environment. Accordingly, FIG. 3 depicts an embodiment wherein at least some of the components of the C-AFM system 100 are positioned within a housing 116, wherein a vacuum is established within the housing 116 by a simplistically depicted vacuum system 118 that is operatively coupled to the housing 116 and can be controlled by the at least one controller 114. The vacuum system 118 may be any commercially available vacuum that is capable of establishing a vacuum within the housing 116. The vacuum system 118 typically includes one or more vacuum pumps (not shown), various fluid flow conduits (not shown) and various electronics (not shown). In one illustrative embodiment, the ambient within the housing 116 may be an inert gas, such as argon. The magnitude of the vacuum created by the vacuum system 118 may vary depending upon the particular application. In some applications, the vacuum system 118 may be adapted to create a vacuum in the housing of about $10^{-3}$-$10^{-9}$ Torr.

Figure 4:
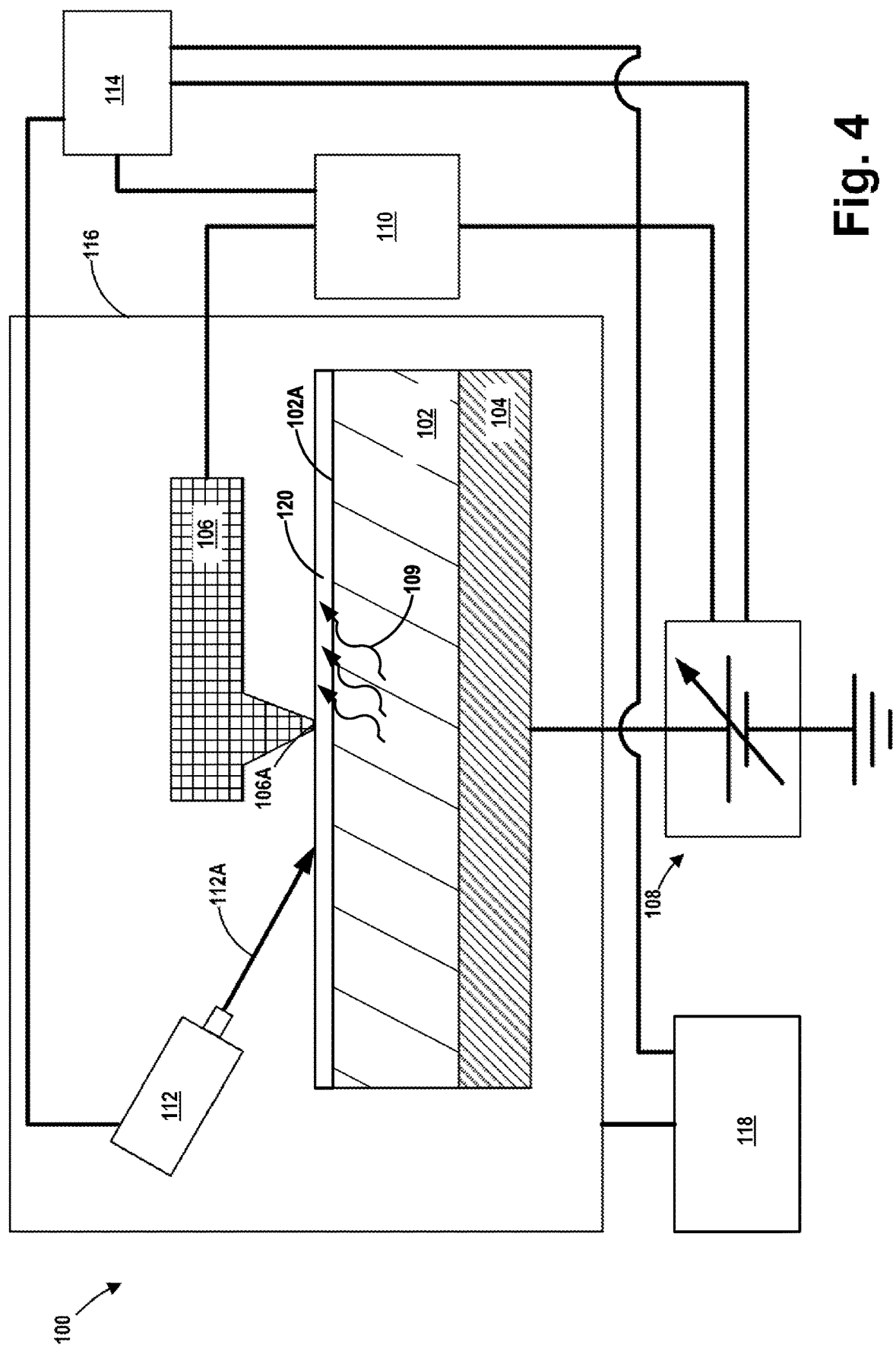

As will be appreciated by those skilled in the art after a complete reading of the present application, the novel C-AFM system 100 disclosed herein may be employed to not only measure various characteristics of a doped semiconductor material 102, but it also may be employed to measure certain characteristics of films or layers of one or more materials formed above the surface 102A of the doped semiconductor material 102. In this particular example, the semiconductor material 102 may in fact be low-doped material. Accordingly, FIG. 4 depicts an embodiment wherein the C-AFM system 100 is adapted to measure one or more properties or characteristic of a simplistically depicted and representative layer of material 120 that was formed on the doped or undoped semiconductor material 102. The layer of material 120 is representative in nature in that it may represent a single layer of material or multiple layers of material. The layer or layers of material 120 may be formed to any desired thickness and it or they may be formed by any desired process, e.g., a deposition process, a thermal growth process, etc. The layer or layers of material 120 may be comprised of any desired material, e.g., a conductive material, an insulating material, silicon dioxide, a high-k gate insulation layer, polymers, etc. In some cases, the layers of material 120 may comprise both conductive materials and insulating materials. The layer of material 120 or one or more layers of material in a stack of such layers 120, may be doped with an N-type or P-type dopant material. If present, the dopant concentration in the layer(s) of material 120 may vary depending upon the particular application. In one illustrative example, the dopant concentration of the layer(s) of material 120 may fall within the range of about $1e^{12}$-$1e^{20}$ ion/cm$^3$.

The novel C-AFM system 100 is adapted to be operated in the manner disclosed above to cause photoemission of electrons (i.e., free charge carriers), as simplistically depicted by the arrows 109, from the valance band edge of the material of the layer or layers of material 120 and thereby enhance the conductivity of the layer or layers of material 120. As the measurement process occurs, various electrical-related parameters of the layer or layers of material 120 may be recorded by the measurement device 110 and transmitted to the controller 114, e.g., the current flowing through the layer or layers of material 120 and/or the resistivity of the layer or layers of material 120, etc. Based upon this electrical-related information about the layer or layers of material 120, a variety of properties of the layer or layers of material 120 may be determined or calculated, e.g., dopant concentration levels, grain boundary resistance values, resistance across interfacial films, etc.

Figure 5:
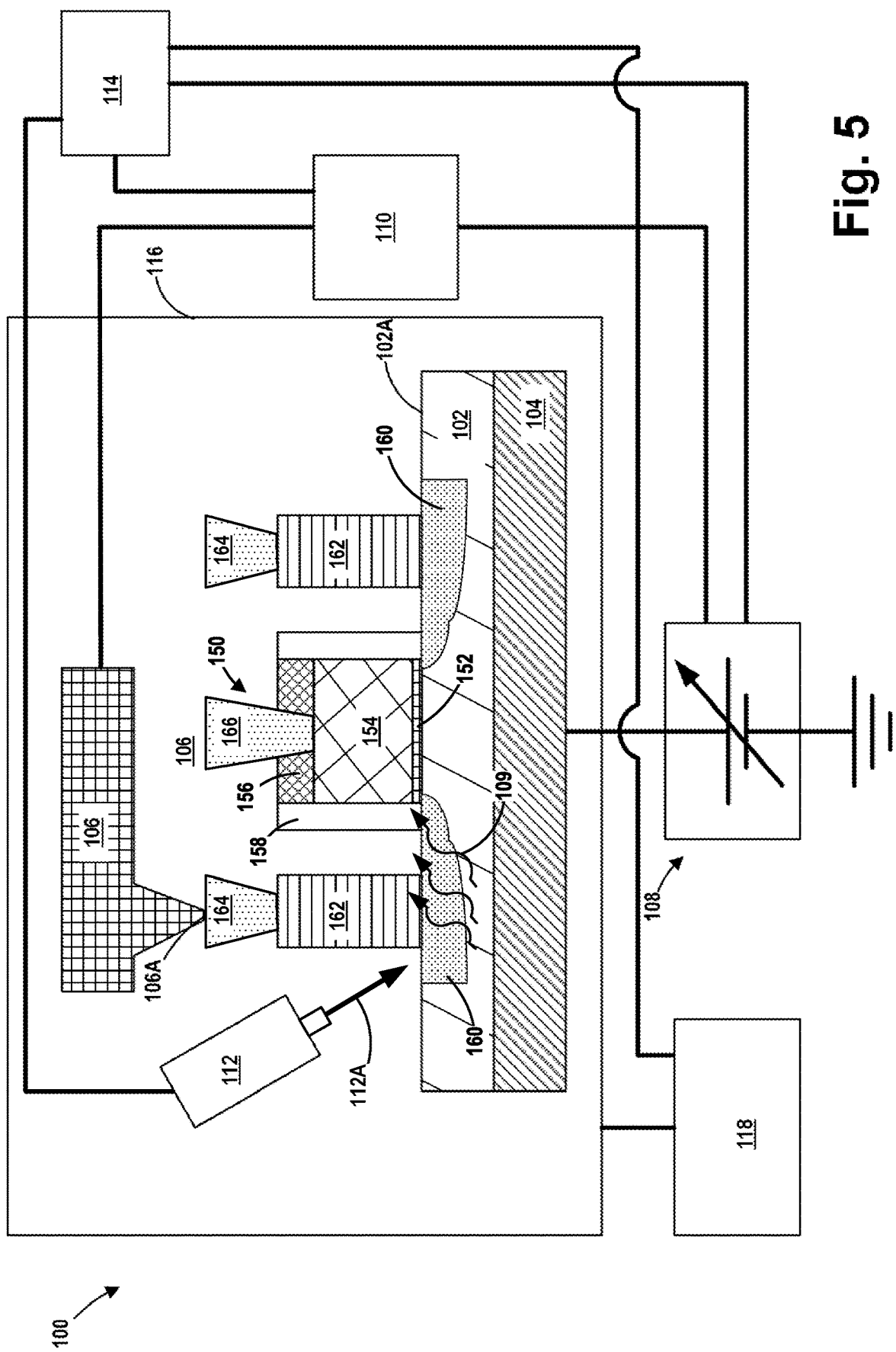

As will be further appreciated by those skilled in the art after a complete reading of the present application, the novel C-AFM system 100 disclosed herein may be employed to not only measure various characteristics of a doped semiconductor material 102 and the layer(s) of material 120, as described above, but it also may be employed to measure certain characteristics of various active or passive circuit elements or devices commonly employed in integrated circuit products, e.g., transistors, capacitors, resistors, metallization layers, etc., all of which will be generically referred to in the appended claims as a "device structure." Accordingly, FIG. 5 depicts an embodiment wherein the C-AFM system 100 is adapted to measure one or more properties or characteristics of a simplistically depicted and representative transistor device 150. The transistor device 150 may be an N-type device or a P-type device and it may be made by performing known manufacturing techniques using traditional materials. The transistor device 150 may be a planar device, or it may have a 3D configuration, e.g., a FinFET device. The transistor device 150 generally comprises a gate insulation layer 152 (e.g., silicon dioxide, a high-k material), a gate electrode 154 (e.g., polysilicon, a metal or metal alloy), a gate cap 156 (e.g., silicon nitride), a sidewall spacer 158 (e.g., silicon nitride), and doped source/drain regions 160 (the dopant concentration of which may vary depending upon the particular application. The gate structure (i.e., the gate insulation layer 152 and the gate electrode 154) of the transistor 150 may be manufactured using gate-first or replacement gate manufacturing techniques. Also depicted in FIG. 5 are illustrative source/drain metallization structures 162 (e.g., trench silicide structures) that are conductively coupled to the source/drain regions 160. Lastly, simplistically depicted source/drain contact structures 164 are conductively coupled to the source/drain metallization structures 162 and a gate contact structure 166 is conductively coupled to the gate electrode 154. In the simplistic drawing depicted in FIG. 5, the contact structures 164 and 166 are depicted as being positioned in the same plane, i.e., the plane of the drawing page, which may not be the case in a real-world device.

The novel C-AFM system 100 is adapted to be operated in the manner disclosed above to cause photoemission of electrons (i.e., free charge carriers), as simplistically depicted by the arrows 109, from the valance band edge of the material of some region or portion of the transistor device 150, e.g., the gate electrode 154, a source/drain region 160, etc. In the depicted example in FIG. 5, the cantilever beam probe 106 is indirectly conductively coupled to the irradiated portion of the device structure, e.g., one of the source/drain regions 160, via the source/drain metallization structure 162 and the source/drain contact structure 164. While the cantilever beam probe 106 is conductively coupled to the source/drain contact structure 164 by, i.e., the conductive tip 106A of the cantilever beam probe 106, the irradiation source 112 is actuated to irradiate one of the source/drain regions 160 to enhance the conductivity of the irradiated source/drain region 160. As the measurement process occurs, various electrical-related parameters of the overall transistor device 150 may be recorded by the measurement device 110 and transmitted to the controller 114, e.g., the current flowing through the overall transistor device 150 and/or the resistivity of the overall transistor device 150, etc. Based upon this electrical-related information about the overall transistor device 150, a variety of properties of the overall transistor device 150 may be determined or calculated, e.g., dopant concentrations, resistivity, grain boundary density, etc.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is there-fore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A method, comprising:
   measuring at least one electrical-related parameter of a doped semiconductor material by simultaneously:
   irradiating at least a portion of an upper surface of the doped semiconductor material with radiation, thereby defining an irradiated portion of the doped semiconductor material;
   urging a conductive tip of a cantilever beam probe into conductive contact with the upper surface of the irradiated portion of the doped semiconductor material; and
   generating an electrical current that flows through the doped semiconductor material, through a measurement device that is operatively coupled to the cantilever beam probe and through the cantilever beam probe, wherein the measurement device measures the at least one electrical-related parameter of the doped semiconductor material, wherein the doped semiconductor material has a dopant concentration of at most approximately $1E^{15}$ ions/cm$^3$.

2. The method of claim 1, wherein measuring the at least one electrical-related parameter of the doped semiconductor material comprises measuring one of a current flowing through the doped semiconductor material or a resistivity of the doped semiconductor material.

3. The method of claim 1, wherein irradiating the at least a portion of an upper surface of the doped semiconductor material with radiation comprises irradiating at least a portion of an upper surface of the doped semiconductor material with radiation with an energy level per photon that falls, inclusively, within a range of 124 eV-124 keV.

4. The method of claim 1, wherein irradiating the at least a portion of an upper surface of the doped semiconductor material comprises actuating a radiation source that is operatively coupled to at least one controller and wherein generating the electrical current comprises actuating a voltage supply source so as to generate a voltage across the doped semiconductor material, wherein the voltage supply source is operatively coupled to an electrode that is conductively coupled to the doped semiconductor material.

5. The method of claim 1, wherein irradiating the at least a portion of an upper surface of the doped semiconductor material causes an increase in free charge carriers in the irradiated portion of the doped semiconductor material.

6. The method of claim 1, further comprising providing relative movement between the doped semiconductor material and the conductive tip while measuring the at least one electrical-related parameter of the doped semiconductor material, wherein the doped semiconductor material has a general cylindrical configuration.

7. The method of claim 1, wherein, prior to measuring the at least one electrical-related parameter of the doped semiconductor material, the method further comprises:
   positioning the doped semiconductor material in a housing; and
   generating a vacuum ambient within the housing, wherein measuring the at least one electrical-related parameter of the doped semiconductor material is performed while the doped semiconductor material is in the vacuum ambient.

8. The method of claim 7, wherein generating the vacuum ambient within the housing comprises generating a vacuum ambient within the housing within a range of about $10^{-3}$-$10^{-9}$ Torr.

9. A method, comprising:
   positioning a doped semiconductor material in a housing;
   generating a vacuum ambient within the housing,
   measuring at least one electrical-related parameter of at least one layer of material positioned above the doped semiconductor material by simultaneously:
   irradiating at least a portion of an upper surface of the at least one layer of material with radiation, thereby defining an irradiated portion of the at least one layer of material;
   urging a conductive tip of a cantilever beam probe into contact with the upper surface of the irradiated portion of at least one layer of material; and
   generating an electrical current that flows through the at least one layer of material, through the doped semiconductor material, through a measurement device that is operatively coupled to the cantilever beam probe and through the cantilever beam probe, wherein the measurement device measures the at least one electrical-related parameter of the at least one layer of material, wherein measuring the at least one electrical-related parameter of the at least one layer of material is performed while the doped semiconductor material is in the vacuum ambient.

10. The method of claim 9, wherein measuring the at least one electrical-related parameter of the at least one layer of material comprises measuring one of a current flowing through the at least one layer of material or a resistivity of the at least one layer of material.

11. The method of claim 9 wherein the at least one layer of material comprises a plurality of layers of material.

12. The method of claim 9, wherein the at least one layer of material comprises one of a conductive material, an insulating material, silicon dioxide, a high-k gate insulation layer or a polymer.

13. The method of claim 9, wherein irradiating at least a portion of an upper surface of the at least one layer of material with radiation comprises irradiating at least a portion of an upper surface of the at least one layer of material with radiation with an energy level per photon that falls, inclusively, within a range of 124 eV-124 keV.

14. The method of claim 9, wherein generating the electrical current comprises actuating a voltage supply source so as to generate a voltage across the doped semiconductor material and the at least one layer of material, wherein the voltage supply source is operatively coupled to an electrode that is conductively coupled to the doped semiconductor material.

15. The method of claim 9, further comprising providing relative movement between the doped semiconductor material and the conductive tip while measuring the at least one electrical-related parameter of the at least one layer of material.

16. The method of claim 9, wherein generating a vacuum ambient within the housing comprises generating a vacuum ambient within the housing within a range of about $10^{-3}$-$10^{-9}$ Torr.

17. The method of claim 9, wherein irradiating the at least a portion of an upper surface of the at least one layer of material causes an increase in free charge carriers in the irradiated portion of the at least one layer of material.

18. A method, comprising:
measuring at least one electrical-related parameter of a device structure comprising a doped semiconductor material by simultaneously:
irradiating at least a portion of the device structure with radiation, thereby defining an irradiated portion of the device structure;
urging a conductive tip of a cantilever beam probe into a position whereby the conductive tip is conductively coupled to the irradiated portion of the device structure; and
generating an electrical current that flows through the device structure, through a measurement device that is operatively coupled to the cantilever beam probe and through the cantilever beam probe, wherein the measurement device measures the at least one electrical-related parameter of the device structure, wherein the doped semiconductor material has a dopant concentration of at most approximately $1E^{15}$ ions/cm$^3$.

19. The method of claim 18, further comprising providing relative movement between the doped semiconductor material and the conductive tip while measuring the at least one electrical-related parameter of the doped semiconductor material, wherein the doped semiconductor material has a general cylindrical configuration.

20. The method of claim 18, further comprising:
positioning the doped semiconductor material in a housing; and
generating a vacuum ambient within the housing, wherein measuring the at least one electrical-related parameter of the doped semiconductor material is performed while the doped semiconductor material is in the vacuum ambient.

* * * * *